Nov. 1, 1960 G. H. MYERS 2,958,730

SELECTIVE SWITCHING SYSTEM

Filed June 19, 1959 2 Sheets-Sheet 1

INVENTOR.
G. H. MYERS
BY
ATTORNEY
AGENT

INVENTOR.
G. H. MYERS
BY Wade Koontz
ATTORNEY
and
James S. Shannon
AGENT

United States Patent Office 2,958,730

Patented Nov. 1, 1960

2,958,730

SELECTIVE SWITCHING SYSTEM

George H. Myers, 764 Scotland Road, South Orange, N.J.

Filed June 19, 1959, Ser. No. 821,617

1 Claim. (Cl. 179—1)

(Granted under Title 35, U.S. Code (1952), sec. 266)

The invention described herein may be manufactured and used by or for the United States Government for governmental purposes without payment to me of any royalty thereon.

The purpose of this invention is to provide means for switching alternating current signals to any selected one of a plurality of remotely located output circuits or loads by means of a superimposed direct current bias. The device is particularly useful in intercommunication systems where it reduces the required number of conductors per station to four, as compared to a pair for each station less one in the network as in present systems. The switching device also permits the station amplifiers to be located centrally rather than at each station with the advantage of a common power supply and other savings. Among other uses, the device may be employed for selective ringing in party-line telephone systems having a large number of parties relative to the maximum of four with present techniques.

The invention will be described in detail with reference to the specific embodiments thereof shown in the accompanying drawings, in which—

Figure 1:
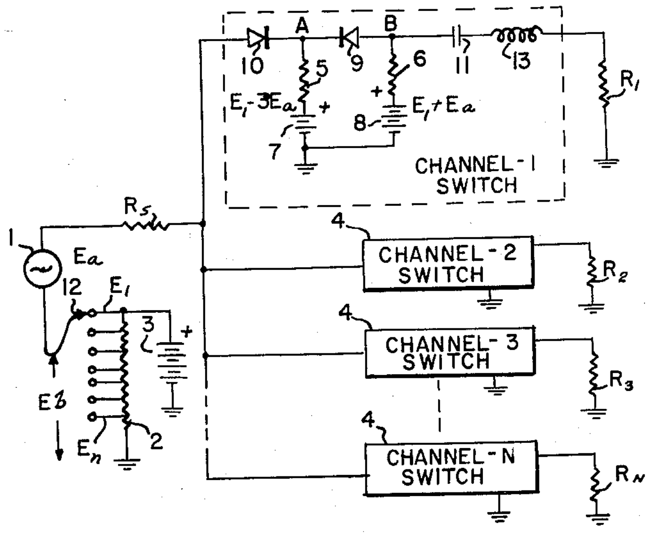
Fig. 1 is a schematic diagram illustrating the principle of the invention.
Figure 2:
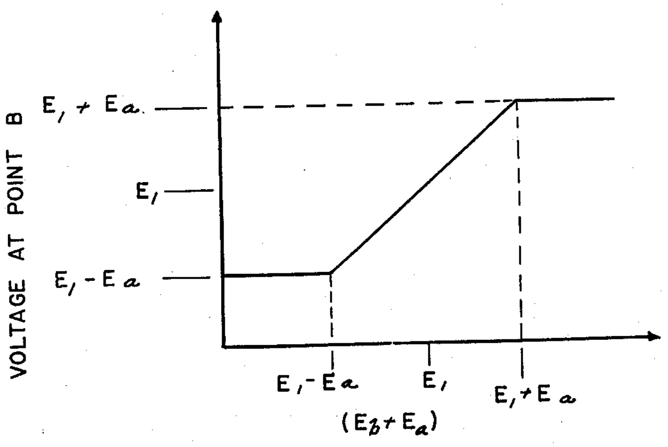
Fig. 2 is a graph showing the operating characteristic of a switching device in accordance with this invention and Fig. 3 is a schematic diagram of an intercommunication system employing the invention.

Referring to Fig. 1, 1 is a source of alternating current having a maximum voltage excursion, in either direction from zero, of $E_a$ volts. $R_s$ represents the source impedance. $E_b$ is a direct voltage obtained from tapped potentiometer 2 supplied with direct current from source 3. The minimum value of $E_b$ is made such as to exceed the maximum value of $E_a$. Also, for reasons which will be apparent later, the values of $E_b$ must be separated by at least 2 $E_a$.

The voltage $E_b$ and the superimposed voltage $E_a$ are applied in parallel to a plurality of basically identical switching devices 4 which operate under the control of $E_b$ to apply the alternating voltage of source 1 to a selected one of the plurality of loads $R_1$–$R_n$. Referring to switching device 4 for Channel 1, which is shown in detail, and considering for the moment the voltage of source 1 and $E_b$ to be zero, if resistors 5 and 6 are equal and if direct current bias sources 7 and 8 are given the values $E_1-3E_a$ and $E_1+E_a$, respectively, where $E_1$ is the value of $E_b$ at that tap on potentiometer 2 corresponding to Channel 1, then the potential at point A is $E_1-E_a$ and that at point B is substantially the same, being only slightly higher by the amount of the voltage drop across the conductive diode 9. Diode 10, under preceding conditions, is nonconductive. Now, if $E_b$ is steadily increased from zero, point A remains at the potential $E_1-E_a$ until $E_b$ equals this value. At this point diode 10 becomes conductive and the potential of point A follows $E_b$ upward. As the potential of point A rises, the declining current in diode 9 and resistor 6 allows point B to rise with it until the potential of point A reaches the value $E_1+E_a$, the potential of source 8, at which point the current through diode 9 and resistor 6 has been reduced to zero and no further rise in the potential of point B can occur. Therefore, with $E_b$ set at the value $E_1$, the potential at point B is constrained to lie within the limits $E_1-E_a$ and $E_1+E_a$ so that the voltage at this point consists, in effect, of a direct component $E_1$ with an alternating component $\pm E_a$ superimposed on it. The direct component is removed by blocking condenser 11 so that the alternating component only appears across the load $R_1$.

The remaining switching devices 4 of the system are the same as that for Channel 1 except that the voltages of sources 7 and 8 are based on different voltages $E_2$, $E_3 \ldots E_n$. Each, therefore, will pass voltages lying within the range $E_n \pm E_a$ and exclude others. The desired channel may be selected by placing contact 12 on the appropriate tap of potentiometer 2. The separation between the voltages $E_1$, $E_2$, $E_3 \ldots E_n$ should be at least $2E_a$, as mentioned previously, to prevent cross-talk between channels. The values of resistors 5 and 6, which are preferably equal, should be much greater than $R_s$. Also the load impedances $R_1$, $R_2 \ldots R_n$ should be much greater than $R_s$.

It is desirable to make the capacitor 11 large enough to offer very low impedance at the frequency of the alternating signal. However, this introduces a problem when the voltage $E_b$ increases through the range of the output of any particular channel. Thus if the value of $E_b$ suddenly changes from maximum to $E_n$, the voltages at point B of all channels with numbers less than $n$ will drop from their high values to their low values and a transient pulse will pass the blocking capacitors and appear in the output. This pulse may be minimized in two ways which may be used simultaneously. First, the output may contain a band pass filter passing the frequencies which the alternating signal may have. The inductor 13 of Fig. 1 serves this purpose. For best performance the circuit consisting of $R_1$, capacitor 11 and inductor 13 should be highly damped. If the load itself has a low-pass characteristic, such as a bell ringer or loudspeaker for example, the inductor may not be necessary. The second method is to increase $E_b$ gradually instead of suddenly but, nevertheless, rapidly enough that the A.C. signal does not have time to establish itself on the outputs of other channels which might be momentarily switched in during this change. For this method, potentiometer 2 would be arranged for continuous rather than stepped variation.

Figure 3:
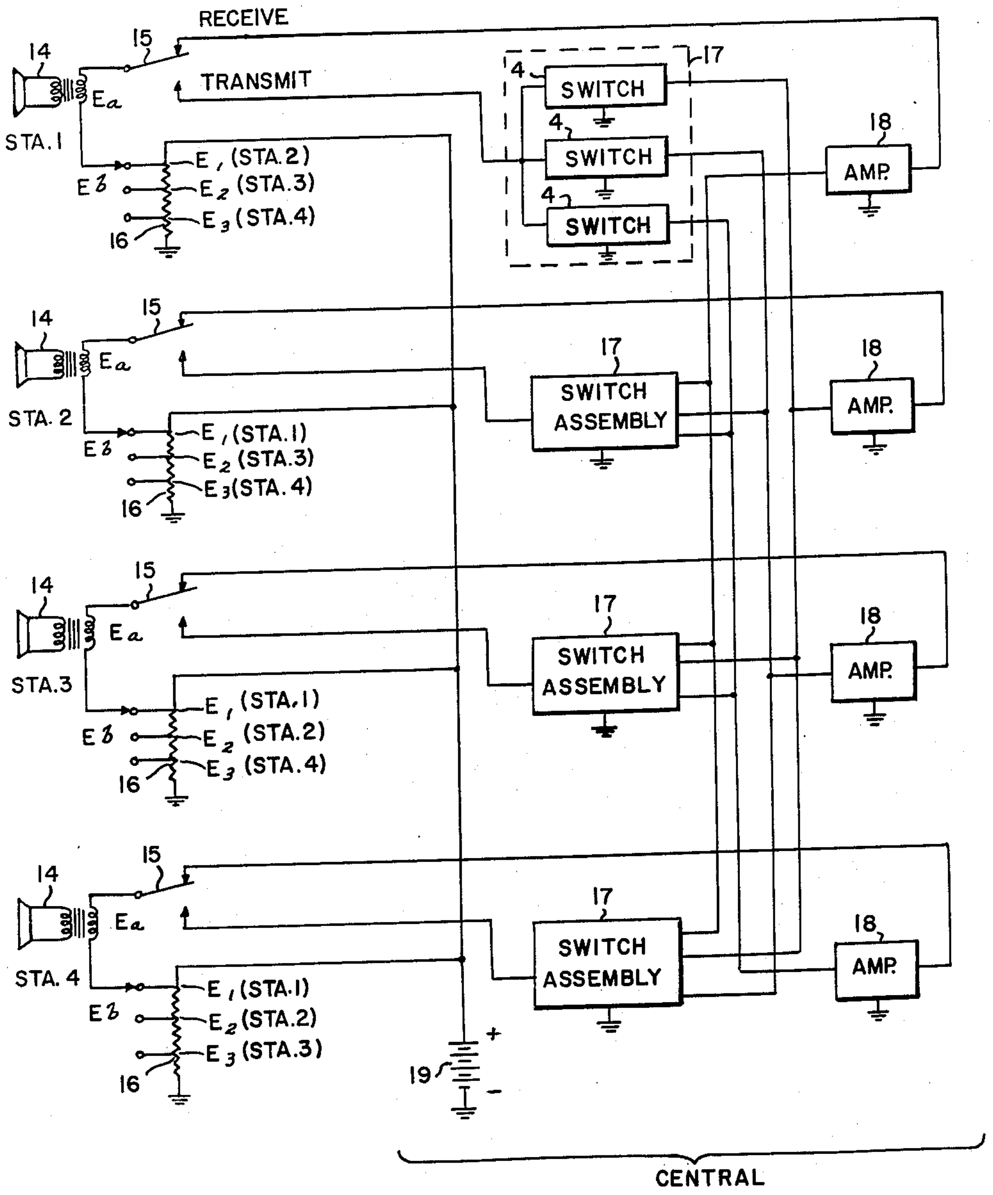

Fig. 3 illustrates the manner of applying the invention to an intercommunication system. The system illustrated has four stations for the sake of simplicity, but any number of stations can be accommodated. Each station consists of a permanent magnet speaker 14 having an alternating voltage with a maximum value of $\pm E_a$, a transmit-receive switch 15 and a potentiometer 16 which corresponds to potentiometer 2 in Fig. 1 and supplies the voltage $E_b$. There are four conductors, including a common conductor which may be ground, between each station and a central. The central contains a switch assembly 17 for each station and an amplifier 18 for each station. The "transmit" terminal of switch 15 at each station is connected to the input of the corresponding switch assembly at the central and the "receive" terminal of this switch is connected to the output of the corresponding amplifier at the central. Each switch assembly 17 has one less output than there are stations in the system, in this case three outputs, with each of these outputs connected to the input of one of the amplifiers, excepting the amplifier corresponding to the same station as the particular switch assembly.

Each switch assembly 17 is made up of a plurality of switching devices 4 of the type shown in Fig. 1 with their inputs connected in parallel and their outputs forming the separate outputs of the assembly. The number of switching devices 4 is one less than the number of stations, in this case three. In each switch 4 the potentials of sources 7 and 8 (Fig. 1) are based on the corresponding potentials $E_1$, $E_2$, $E_3$ etc. supplied by potentiometer 16. The voltages must be separated by a voltage equal to at least $2E_a$ as already pointed out for Fig. 1. In Fig. 3 the potentiometers 16 are supplied from a common source 19 at the central. They could also be supplied from local sources if desired, which would eliminate one station conductor.

To operate the system of Fig. 3 the caller places the contact of potentiometer 16 on the tap supplying the value of $E_b$ for the station to be called. For example, to call station No. 2 from station No. 1 the potentiometer at station No. 1 is placed on the $E_1$ tap. When the switch 15 at station No. 1 is actuated to the transmit terminal the voltage $E_1$, with the signal from speaker 14 superimposed, is applied to the three switch devices 14 in the assembly 17 associated with station No. 1. The signal will then be passed by the switch 4, in Fig. 3 the top switch, that has the potentials of its sources 7 and 8 (Fig. 1) based on $E_1$. This switch then passes the superimposed alternating signal to the input of the amplifier 18 whose output is connected to the switch 15 in station No. 2. In return conversation, the switch 15 at station No. 2 is depressed which causes the associated switch assembly 17 to act in the above described manner to connect the speaker of station No. 2 to the input of the amplifier 18 that has its output connected to station No. 1. It is also possible to carry the return conversation over the same line, i.e. without operating switch 15 at station No. 2, by providing for bi-directional transmission in amplifiers 18 through the use of hybrid coils in accordance with standard telephone practice. This arrangement, however, destroys privacy since any station can listen to any other station by selecting the appropriate value of $E_b$ at potentiometer 16.

As previously mentioned, the switching device 4 may be used in a party line telephone system to provide selecting ringing of a relatively large number of parties. The arrangement would be fundamentally the same as in Fig. 1 with bell ringers taking the place of loads $R_1$, $R_2 \ldots R_n$.

I claim:

An intercommunication system comprising: a plurality of similar groups of elements, each group comprising a bidirectional sound-electrical signal transducer, a bias source having a negative terminal connected to a point of reference potential and positive terminals one less in number than the number of said groups with the potential of each positive terminal exceeding the maximum amplitude of said electrical signal and differing from that of any other positive terminal by at least twice the maximum amplitude of said electrical signal, a transmit-receive switch, a switch assembly and an amplifier, the switch assemblies and amplifiers of said groups being located at a central and the remaining elements in each group being located at a point remote from said central; each switch assembly comprising switching devices equal in number to one less than the number of said groups, each switching device comprising first and second diodes having their cathodes connected together, first and second sources of direct potential each having its negative terminal connected to a point of reference potential, a resistor connected between said cathodes and the positive terminal of said first source, a resistor connected between the anode of said second diode and the positive terminal of said second source, and an output circuit connected between the anode of said second diode and said point of reference potential; means in each group for connecting one terminal of said transducer selectively to any one of the positive terminals of said bias source and means for connecting the other terminal of said transducer through said transmit-receive switch in its "receive" position to the output of the amplifier in the particular group and in the "transmit" position to each of the anodes of the first diodes in the switching devices of the switching assembly in the particular group; the said second source in each of said switching devices having a potential equal to the sum of the potential of one of the positive terminals of the bias source in the same group and the maximum amplitude of said electrical signal, and the potential of said first source in each of said switching devices being such that the potential between the cathodes of said diodes and said point of reference potential is equal to the difference between the potential of the said one positive terminal and the maximum amplitude of said electrical signal; and means coupling the output circuit of each of said switching devices of one group to the input of the amplifier in another group.

References Cited in the file of this patent

UNITED STATES PATENTS

| | | |
|---|---|---|
| 2,008,563 | Sarbey | Dec. 13, 1933 |
| 2,616,960 | Dell et al. | Nov. 4, 1952 |